United States Patent
Singh et al.

(10) Patent No.: US 7,251,582 B2
(45) Date of Patent: Jul. 31, 2007

(54) FAULT DIAGNOSIS

(75) Inventors: Ritindar Singh, Cranfield (GB); Suresh Sampath, Cranfield (GB)

(73) Assignee: Rolls-Royce, PLC, London (GB)

( * ) Notice: Subject to any disclaimer, the term of this patent is extended or adjusted under 35 U.S.C. 154(b) by 518 days.

(21) Appl. No.: 10/752,537

(22) Filed: Jan. 8, 2004

(65) Prior Publication Data
US 2004/0216004 A1    Oct. 28, 2004

(30) Foreign Application Priority Data
Jan. 24, 2003    (GB) ................. 0301707.6

(51) Int. Cl.
*G06F 9/00*    (2006.01)
(52) U.S. Cl. .................... 702/183; 702/185; 714/25
(58) Field of Classification Search ............. 702/123, 702/179, 182, 183, 185, 186, 188; 705/7, 705/8; 706/13, 45; 714/48, 10, 25; 703/14
See application file for complete search history.

(56) References Cited

U.S. PATENT DOCUMENTS

| | | | |
|---|---|---|---|
| 5,105,372 A | 4/1992 | Provost et al. ............. | 702/185 |
| 5,539,652 A | 7/1996 | Tegethoff .................... | 703/14 |
| 5,897,629 A | 4/1999 | Shinagawa et al. .......... | 706/13 |
| 6,052,678 A | 4/2000 | Itoh et al. .................... | 706/13 |
| 6,282,527 B1 | 8/2001 | Gounares et al. ............ | 706/13 |
| 6,324,659 B1 | 11/2001 | Pierro ......................... | 714/48 |
| 6,606,580 B1 | 8/2003 | Zedda et al. ................ | 702/185 |
| 7,017,079 B2 * | 3/2006 | Gulati et al. ................ | 714/25 |
| 2001/0034628 A1 | 10/2001 | Eder ............................ | 705/7 |

FOREIGN PATENT DOCUMENTS

| | | |
|---|---|---|
| EP | 1 103 926 A2 | 5/2001 |
| GB | 2 362 481 A | 11/2001 |
| WO | WO 00/38079 | 6/2000 |

OTHER PUBLICATIONS

Potter et al. "Improving the Reliability of Heuristic Multiple Fault Diagnosis Via the EC-Based Genetic Algorithm," Journal of Applied Intelligence Jul. 2, 1992, pp. 5-23.

(Continued)

*Primary Examiner*—John Barlow
*Assistant Examiner*—John Le
(74) *Attorney, Agent, or Firm*—Oliff & Berridge, PLC

(57) ABSTRACT

Methods for estimating performance of and/or detecting faults in components of a multi-component system, where the performance of each component is defined by one or more performance parameters x related to measurement parameters z that can be expressed as a function of the performance and operating parameters defining an operating condition of the system. The methods include: defining a series of fault classes corresponding to possible outcomes of faulty components; creating an initial population of strings for each fault class, each including a plurality of elements corresponding to the performance and operating parameters, values being assigned to the string elements which represent estimated values of said parameters and are constrained only to indicate fault affected values for performance parameters of the fault affected component of the respective class; and optimising an objective function which gives a measure of the consistency between measured and calculated values of the measurement parameters.

14 Claims, 8 Drawing Sheets

OTHER PUBLICATIONS

Zhou et al. "Diagnosis Based on Genetic Algorithms and Fuzzy Logic in NPPs," 14th International Conference on Industrial and Engineering Applications of Artificial Intelligence and Expert Systems, Jun. 2001, pp. 359-366.

Juric, "Optimizing Genetic Algorithm Parameters for Multiple Fault Diagnosis Applications," Proceedings of the Tenth Conference on Artificial Intelligence for Applications, IEEE, 1994, pp. 434-440.

Gulati et al. "Gas Turbine Engine and Sensor Multiple Operating Point Analysis Using Optimization Techniques," American Institute of Aeronautics and Astronautics, 2000, pp. 1-8.

Gulati et al. "Multiple Operating Point Analysis Using Genetic Algorithm Optimisation for Gas Turbine Diagnostics," International Society for Air Breathing Engines, 2001, pp. 1-8.

Zedda et al. "Gas Turbine Engine and Sensor Fault Diagnosis Using Optimisation Techniques," American Institute of Aeronautics and Astronautics, 1999, pp. 1-11.

Zedda et al. "Gas Turbine Engine and Sensor Diagnostics," International Society for Air Breathing Engines, 1999, pp. 1-9.

Stamatis et al. "Discrete Operating Conditions Gas Path Analysis," Laboratory of Thermal Turbomachines, 1999, pp. 33-1 - 33-5.

* cited by examiner

INTERCOOLED RECUPERATED-WR21 DIAGNOSIS REPORT-1

Performance Engineering Group, Cranfield University
Test Case: WR21/DIAG/ 139

TIME/DATE: 19:32:23 [05-Oct-02]

Fault Class Analysis

| FC | MOF | Time | Efficiency Change (Δη) - Percentage | | | | Flow Capacity (ΔΓ)- Percentage | | | |
|---|---|---|---|---|---|---|---|---|---|---|
| | | | Component-1 | | Component-2 | | Component-1 | | Component-2 | |
| | | | Δη | Comp-ID | Δη | Comp-ID | ΔΓ | Comp-ID | ΔΓ | Comp-ID |
| FC-1 | 6.6985 | 41 | 2.9936 | LPC | - | - | 0.3106 | LPC | - | - |
| FC-2 | 0.6535 | 44 | 2.9977 | HPC | - | - | -4.1201 | HPC | - | - |
| FC-3 | 8.8609 | 44 | 1.9450 | ICL | - | - | 1.9726 | ICL | - | - |
| FC-4 | 1.6439 | 42 | 2.8840 | HPT | - | - | 0.0569 | HPT | - | - |
| FC-5 | 4.4159 | 43 | 2.9883 | LPT | - | - | 1.4837 | LPT | - | - |
| FC-6 | 5.5543 | 43 | 1.4346 | FPT | - | - | 0.8447 | FPT | - | - |
| FC-7 | 9.2864 | 43 | 0.0826 | RCR | - | - | 1.9635 | RCR | - | - |
| FC-8 | 4.1664 | 43 | 1.6500 | LPC | 1.5961 | ICL | 2.0236 | LPC | 1.5245 | HPC |
| FC-9 | 6.8476 | 41 | 2.5038 | LPC | 0.2788 | HPC | 0.2253 | LPC | 0.1135 | ICL |
| FC-10 | 3.4239 | 43 | 0.2152 | LPC | 2.7097 | HPT | -1.8751 | LPC | -0.3236 | HPT |
| FC-11 | 2.8611 | 43 | 2.4577 | LPC | 2.8652 | LPT | -0.4357 | LPC | 2.2961 | LPT |
| FC-12 | 5.5043 | 44 | 1.2233 | LPC | 1.5429 | FPT | 1.1373 | LPC | 0.0701 | FPT |
| FC-13 | 7.1217 | 45 | 2.5607 | LPC | 1.1172 | RCR | 0.4058 | LPC | 0.4099 | RCR |
| FC-14 | 1.9765 | 41 | 2.1282 | ICL | 0.7708 | HPC | 1.2203 | HPC | 0.3053 | HPC |
| FC-15 | 1.5409 | 43 | 1.4288 | ICL | 1.4506 | HPT | 0.4339 | HPC | 0.4445 | HPT |
| FC-16 | 1.1903 | 42 | 2.7331 | ICL | 0.9499 | LPT | -0.3368 | HPC | 0.4918 | LPT |
| FC-17 | 3.0878 | 41 | 1.9966 | ICL | 0.0262 | FPT | 1.3467 | HPC | 0.7564 | FPT |
| FC-18 | 1.0309 | 42 | 2.8562 | ICL | 1.5714 | RCR | 0.3263 | HPC | 0.1307 | RCR |
| FC-19 | 2.5444 | 44 | 1.3465 | HPC | 2.4667 | HPT | 0.1676 | ICL | -0.7332 | HPT |
| FC-20 | 2.8582 | 40 | 0.6280 | HPC | 2.8753 | LPT | 1.5576 | ICL | 2.2542 | LPT |
| FC-21 | 7.3985 | 44 | 0.9473 | HPC | 2.1197 | FPT | 0.5447 | ICL | -0.1576 | FPT |
| FC-22 | 8.9592 | 40 | 1.9875 | HPC | 0.1152 | RCR | 1.9896 | ICL | 1.9858 | RCR |
| FC-23 | 2.3033 | 42 | 2.5228 | HPT | 0.6410 | LPT | 0.6047 | HPT | 0.3293 | LPT |
| FC-24 | 3.4347 | 42 | 2.0559 | HPT | 0.1751 | FPT | 0.9242 | HPT | 0.6380 | FPT |
| FC-25 | 3.7199 | 43 | 2.5076 | HPT | 0.1318 | RCR | -1.6660 | HPT | 0.3243 | RCR |
| FC-26 | 3.0895 | 40 | 1.1297 | LPT | 1.0873 | FPT | 2.4597 | LPT | 1.9218 | FPT |
| FC-27 | 3.8738 | 45 | 2.9025 | LPT | 0.4206 | RCR | 2.2393 | LPT | 1.9979 | RCR |
| FC-28 | 6.2933 | 41 | 1.5273 | FPT | 0.4543 | RCR | 0.5137 | FPT | 0.0061 | RCR |
| | | 1184 | | | | | | | | |

Estimated Environment & Power Setting Parameters

| Operating Point-1 | | | Operating Point-2 | | |
|---|---|---|---|---|---|
| Power/Fuel | Temperature | Pressure | Power/Fuel | Temperature | Pressure |
| 26404.5488 | 308.1469 | 1.0002 | 24014.0488 | 308.2270 | 1.0002 |

Fault Detected (Change in Component Performance Parameters)

| Component-1 | | | | Component-2 | | | |
|---|---|---|---|---|---|---|---|
| Δη | Comp-ID | ΔΓ | Comp-ID | Δη | Comp-ID | ΔΓ | Comp-ID |
| -2.9977 | HPC | -4.1201 | HPC | - | - | - | - |

Model Performance -

No of strings: 80
No of generations: 80
Probability of cross-over (PC): 0.6
Probability of mutation (PM): 0.4
Performance Code Runs: 358400
Failed Convergence: 0.00%
Diagnostics Run Time: 19 Hrs   43 Mins   8 Secs

Figure 4a

INTERCOOLED RECUPERATED-WR21 DIAGNOSIS REPORT

Performance Engineering Group, Cranfield University
Test Case: WR21/DIAG/ 144  TIME/DATE: 15:57:50 [11-Oct-02]

Fault Class Analysis

| FC | MOF | Time | Efficiency Change (Δη) - Percentage | | | | Flow Capacity (ΔΓ)- Percentage | | | |
|---|---|---|---|---|---|---|---|---|---|---|
| | | | Component-1 | | Component-2 | | Component-1 | | Component-2 | |
| | | | Δη | Comp-ID | Δη | Comp-ID | ΔΓ | Comp-ID | ΔΓ | Comp-ID |
| FC-1 | 5.6162 | 48 | 1.5835 | LPC | 0.0000 | - | -0.6190 | LPC | 0.0000 | - |
| FC-2 | 7.1221 | 51 | 1.3223 | ICL | 0.0000 | - | -1.7490 | ICL | 0.0000 | - |
| FC-3 | 5.9756 | 55 | 0.0238 | HPC | 0.0000 | - | 1.1043 | HPC | 0.0000 | - |
| FC-4 | 5.0642 | 50 | 1.9347 | HPT | 0.0000 | - | 2.7854 | HPT | 0.0000 | - |
| FC-5 | 5.1640 | 54 | 0.6681 | LPT | 0.0000 | - | -1.2274 | LPT | 0.0000 | - |
| FC-6 | 6.7371 | 45 | 1.1462 | FPT | 0.0000 | - | 0.0836 | FPT | 0.0000 | - |
| FC-7 | 5.9766 | 54 | 0.3779 | RCR | 0.0000 | - | 1.5128 | RCR | 0.0000 | - |
| FC-8 | 5.3516 | 43 | 1.4478 | LPC | 0.0949 | ICL | -0.3594 | LPC | -0.4055 | ICL |
| FC-9 | 5.7943 | 52 | 0.6344 | LPC | 0.2002 | HPC | 1.1108 | LPC | 1.3959 | HPC |
| FC-10 | 1.7991 | 54 | -0.9267 | LPC | -2.1364 | HPT | -3.2561 | LPC | 3.8972 | HPT |
| FC-11 | 5.8215 | 52 | 1.0233 | LPC | 0.6898 | LPT | -0.8533 | LPC | -0.3488 | LPT |
| FC-12 | 5.8559 | 49 | 1.6576 | LPC | 0.6859 | FPT | 0.3125 | LPC | -0.8368 | FPT |
| FC-13 | 5.6094 | 53 | 1.6242 | LPC | 1.3621 | RCR | 0.5493 | LPC | 0.9185 | RCR |
| FC-14 | 5.9769 | 48 | 0.1651 | ICL | 0.1150 | HPC | -0.7267 | ICL | 0.9320 | HPC |
| FC-15 | 4.1596 | 47 | 1.0118 | ICL | 0.9209 | HPT | -1.2461 | ICL | 2.6492 | HPT |
| FC-16 | 5.5767 | 53 | 0.1164 | ICL | 0.8855 | LPT | -1.6915 | ICL | -0.5838 | LPT |
| FC-17 | 7.1052 | 52 | 0.0151 | ICL | 0.9369 | FPT | -1.6136 | ICL | 0.0706 | FPT |
| FC-18 | 6.5024 | 54 | 0.0367 | ICL | 1.2796 | RCR | 0.1925 | ICL | 1.5979 | RCR |
| FC-19 | 2.4680 | 47 | 0.5828 | HPC | 0.0066 | HPT | 1.2301 | HPC | 2.4198 | HPT |
| FC-20 | 4.4266 | 48 | 0.2204 | HPC | 0.3722 | LPT | 0.2142 | HPC | -0.8493 | LPT |
| FC-21 | 6.2337 | 51 | 0.7979 | HPC | 0.1020 | FPT | 1.2713 | HPC | -0.3686 | FPT |
| FC-22 | 6.0749 | 46 | 0.3737 | HPC | 0.2710 | RCR | 1.8550 | HPC | 1.3030 | RCR |
| FC-23 | 3.3136 | 52 | 0.7309 | HPT | 0.3307 | LPT | 2.3726 | HPT | -1.0441 | LPT |
| FC-24 | 4.5188 | 42 | 1.1254 | HPT | 0.1769 | FPT | 2.3160 | HPT | 0.2388 | FPT |
| FC-25 | 2.5736 | 48 | 0.0511 | HPT | -0.2323 | RCR | 2.5878 | HPT | 1.5541 | RCR |
| FC-26 | 4.2603 | 49 | 0.4698 | LPT | 0.7449 | FPT | -0.9764 | LPT | -0.3886 | FPT |
| FC-27 | 4.7964 | 50 | 0.2409 | LPT | 0.4529 | RCR | -0.6033 | LPT | 0.4725 | RCR |
| FC-28 | 6.9976 | 46 | 1.3979 | FPT | 1.5013 | RCR | -0.8216 | FPT | 1.5710 | RCR |
| | | 1399 | | | | | | | | |

Estimated Environment & Power Setting Parameters

| Operating Point-1 | | | Operating Point-2 | | |
|---|---|---|---|---|---|
| Power/Fuel | Temperature | Pressure | Power/Fuel | Temperature | Pressure |
| 26426.3906 | 308.2079 | 1.0003 | 23992.2910 | 308.2154 | 1.0012 |

Fault Detected (Change in Component Performance Parameters)

| Component-1 | | | | Component-2 | | | |
|---|---|---|---|---|---|---|---|
| Δη | Comp-ID | ΔΓ | Comp-ID | Δη | Comp-ID | ΔΓ | Comp-ID |
| -0.9267 | LPC | -3.2561 | LPC | -2.1364 | HPT | 3.8972 | HPT |

Summary-
No of strings: 80
No of generations: 80
Probability of cross-over (PC): 0.6
Probability of mutation (PM): 0.4
Performance Code Runs: 358400
Failed Convergence: 0( 0.00%)
Diagnostics Run Time: 23 Hrs 31 Mins 4 Secs

Figure 4b

INTERCOOLED RECUPERATED-WR21 DIAGNOSIS REPORT

Performance Engineering Group, Cranfield University
Test Case: WR21/DIAG/159                                    TIME/DATE: 09:28:16 [27-Oct-02]

Neural Pre-processor Output

Fault Class-2

Fault Class Analysis

| FC | MOF | Gen | Time | Efficiency Change ($\Delta\eta$) - Percentage | | | | Flow Capacity ($\Delta\Gamma$) - Percentage | | | |
|---|---|---|---|---|---|---|---|---|---|---|---|
| | | | | Component-1 | | Component-2 | | Component-1 | | Component-2 | |
| | | | | $\Delta\eta$ | Comp-ID | $\Delta\eta$ | Comp-ID | $\Delta\Gamma$ | Comp-ID | $\Delta\Gamma$ | Comp-ID |
| FC-2 | 0.7256 | 62 | 29 | -2.9634 | HPC | - | - | -4.2101 | HPC | - | - |
| | | | 29 | | | | | | | | |

Estimated Environment & Power Setting Parameters

| Operating Point-1 | | | Operating Point-2 | | |
|---|---|---|---|---|---|
| Power/Fuel | Temperature | Pressure | Power/Fuel | Temperature | Pressure |
| 26424.4414 | 308.2270 | 1.0002 | 23997.6289 | 308.1990 | 1.0001 |

Fault Detected (Change in Component Performance Parameters)

| Component-1 | | | | Component-2 | | | |
|---|---|---|---|---|---|---|---|
| $\Delta\eta$ | Comp-ID | $\Delta\Gamma$ | Comp-ID | $\Delta\eta$ | Comp-ID | $\Delta\Gamma$ | Comp-ID |
| -2.9634 | HPC | -4.2101 | HPC | - | - | - | - |

Summary-
No of strings: Set initially at 80, but variable
No of generations: Set initially at 80, but terminated at 62 due to convergence
Probability of cross-over (PC): Variable
Probability of mutation (PM): Variable
Elite Strings: 10%
RS Generations: 10 (Number of generations in which Response Surface applied)
Performance Code Runs: 8189
Failed Convergence: 0( 0.00%)
Diagnostics Run Time: 00 Hrs  29 Mins  7 Secs

Figure 5a

INTERCOOLED RECUPERATED-WR21 DIAGNOSIS REPORT

Performance Engineering Group, Cranfield University
Test Case: WR21/DIAG/ 163　　　　　　　　　　　　　　　　TIME/DATE: 11:30:43 [29-Oct-02]

Neural Pre-processor Output

Fault Class-10
Fault Class-19
Fault Class-23
Fault Class-26

Fault Class Analysis

| FC | MOF | Gen | Time | Efficiency Change ($\Delta\eta$) - Percentage | | | | Flow Capacity ($\Delta\Gamma$) - Percentage | | | |
|---|---|---|---|---|---|---|---|---|---|---|---|
| | | | | Component-1 | | Component-2 | | Component-1 | | Component-2 | |
| | | | | $\Delta\eta$ | Comp-ID | $\Delta\eta$ | Comp-ID | $\Delta\Gamma$ | Comp-ID | $\Delta\Gamma$ | Comp-ID |
| FC-10 | 1.3429 | 74 | 32 | -1.1012 | LPC | -1.9763 | HPT | -3.1421 | LPC | 3.9874 | HPT |
| FC-19 | 4.8814 | 67 | 25 | 1.8629 | | 1.8714 | | 0.0603 | | 0.6850 | |
| FC-23 | 5.3869 | 78 | 34 | 2.9356 | | 1.0407 | | 2.1277 | | 0.1555 | |
| FC-26 | 6.0323 | 64 | 28 | 2.5467 | | 1.1781 | | 0.2712 | | -0.0702 | |
| | | | 119 | | | | | | | | |

Estimated Environment & Power Setting Parameters

| Operating Point-1 | | | Operating Point-2 | | |
|---|---|---|---|---|---|
| Power/Fuel | Temperature | Pressure | Power/Fuel | Temperature | Pressure |
| | | | | | |

Fault Detected (Change in Component Performance Parameters)

| Component-1 | | | | Component-2 | | | |
|---|---|---|---|---|---|---|---|
| $\Delta\eta$ | Comp-ID | $\Delta\Gamma$ | Comp-ID | $\Delta\eta$ | Comp-ID | $\Delta\Gamma$ | Comp-ID |
| -1.1012 | LPC | -3.1421 | LPC | -1.9763 | HPT | 3.9874 | HPT |

Summary-
No of strings: Set initially at 80, but variable
No of generations: Set initially at 80, but variable
Probability of cross-over (PC): Variable
Probability of mutation (PM): Variable
Elite Strings: 10%
RS Generations: 10　(Number of generations in which Response Surface applied)
Performance Code Runs:　20112
Failed Convergence: 0( 0.00%)
Diagnostics Run Time: 2 Hrs　59 Mins　2 Secs

Figure 5b

FAULT DIAGNOSIS

FIELD OF THE INVENTION

This invention relates to methods and systems for performance estimation and/or fault diagnosis. In particular, although not necessarily exclusively, it relates to the detection of faults in multi-component systems, typically power plant, whose performance is characterised by a series of indirectly measurable performance parameters. One specifically envisaged application of the invention is the detection and quantification of faults in a gas turbine.

BACKGROUND OF THE INVENTION

Analysis of the performance of gas turbines is important for both testing of development engines and condition monitoring of operating engines. In particular, the ability to identify accurately and reliably the component or components responsible for loss of performance would be particularly beneficial. However, the nature of a gas turbine means there are inherent problems to be addressed if this is to be achieved in practice.

In common with other power plant, a gas turbine's performance can be expressed in terms of a series of performance parameters for the various components of the system. Typically, those chosen to characterise the performance of a gas turbine would be the efficiency and flow function of compressors and turbines and the discharge coefficient of nozzles. Significantly, these performance parameters are not directly measurable. They are, however, related to measurable parameters, such as spool speeds, averaged pressures and temperatures, thrust and air flows, and any loss in performance of a component will be reflected by changes in these measurable parameters (referred to hereinafter as "measurement parameters").

Given a particular operating point, typically defined by environmental conditions and a power setting (inlet temperature and pressure, and fuel flow for example, or other such operating parameters), the relationship between measurement parameters and performance parameters can be represented, for example, in a performance simulation model describing the aerothermodynamics of the gas turbine's components. In principle this enables the performance parameters, and more importantly changes in them from respective reference values, to be calculated. In turn, it should be possible, from these calculated values, to detect a drop in the performance of one or more components and hence deduce the cause of a loss in performance.

In practice, however, it has been found difficult accurately and reliably to relate the calculated changes in performance parameter to the presence of faults in specific components, particularly when deviations from normality or baseline performance are relatively low. This is due at least in part to the non-linearity of the relationship between the measurement parameters and the performance parameters.

There are, however, a number of further obstacles to this diagnostic task. In particular, sensors used to collect the measurement parameters necessarily work in a harsh operating environment. This leads to large measurement noise and a high probability of systematic errors (i.e. biases) in the sensor suite. The same problems affect the measured operating parameters (e.g. environment and power setting parameters). To be effective a diagnostic method has to be able to account for these measurement uncertainty effects.

The term "fault" is used here and in the following to refer to deviations in performance parameters associated with the components from expected, or reference values, often referred to as base line values, as well as errors in measured values arising from measurement biases. Of particular interest is the isolation of faulty components in the system and quantification of the loss in performance.

GB-A-2362481 describes one approach to estimating the performance parameters and the operating parameters based on the optimisation (typically the minimisation) of an objective function. For example, taking a multi-component systems whose performance can be expressed in terms of a series of performance parameters, which can in turn be related to measurement parameters, the relationship between the performance and measurement parameters can be expressed as:

$$\underline{z} = h(\underline{x}, \underline{w}) + \underline{b} + \underline{v}$$

where:

$\underline{z} \in R^M$ is the measurement parameter vector and M is the number of measurement parameters;

$\underline{x} \in R^N$ is the performance parameter delta vector (i.e. relative variation of the performance parameters with respect to a base line or reference value) and N is the number of performance parameters;

$\underline{w} \in R^P$ is the operating parameter vector (i.e. the vector of actual environment and power setting parameters representing the operating condition of the system) and P is the number of operating parameters;

$h(\ )$ is a vector-valued function (which in many cases will be a non-linear function) representing the relationship between the performance parameters and the measurement parameters;

$\underline{b}$ is a measurement bias vector; and $\underline{v}$ is a measurement noise vector.

The measured values of the environment parameters will also be liable to be affected by noise and biases, giving:

$$\underline{u} = \underline{w} + \underline{b}_w + \underline{v}_w$$

where:

$\underline{u}$ is the vector of measured values of the operating parameters;

$\underline{b}_w$ is the vector of biases on these measured values; and $\underline{v}_w$ is the vector of noise on these measured values.

An appropriate objective function for minimisation might be:

$$J(\underline{x}, \underline{w}) = \sum_{j=1}^{M} \frac{|z_j - h_j(\underline{x}, \underline{w})|}{z_{odj}(\underline{w}) \cdot \sigma_j}$$

where:

$z_{odj}(\underline{w})$ is the value of the j-th measurement (i.e. the j-th element of the measurement parameter vector) in the 'off design', undeteriorated condition; and $\sigma_j$ is the noise standard deviation of the j-th measurement.

Noise is assumed to have a Gaussian probability density function, however discrepancies from this model are likely to exist. It is for this reason that absolute values are used in the proposed objective function, rather than the more conventional use of squares, because absolute values give better robustness. The use of absolute values also provides better robustness to modelling errors, e.g. during the simulation of gas turbine performance discussed below. Where this robustness is not required, squared values can be used.

This objective function (J) is a measure of the consistency between actual measurements taken from the system, that is to say measured values of the measurement parameters ($\underline{z}$), and calculated values of the measurement parameters, calculated by employing function $\underline{h}(\ )$, which will typically be embodied in a performance simulation model.

Minimisation of the objective function (J) gives estimated values for the performance and operating parameters ($\underline{x},\underline{w}$). A variety of techniques exist for minimisation of the objective function. One preferred approach is to use a Genetic Algorithm (GA), described in more detail further below. This and other optimisation techniques will generally involve multiple evaluations of the objective function before a minimum (or otherwise optimum) solution is found.

A simple comparison between estimated values of the performance parameters obtained in the above manner and the reference, or base line values for the performance parameters can then in principle reveal loss of performance and hence potential faults. However, in this approach, although reference to the standard deviation of the measurements provides some allowance for noise, no account is taken of possible measurement biases in one or more of the M measurement parameters. In practice, this basic approach does not therefore lead to satisfactory estimation of the performance parameters and consequently does not enable the accurate identification of faulty components of the system.

Thus GB-A-2362481 also describes a modified approach, in which measurement biases are taken into account in the optimisation (e.g. minimisation) of the objective function. The approach is only suited, however, to systems in which there is a redundancy in the measurement parameters.

Essentially the modified approach provides a method for estimating the performance of and/or detecting faults in components of a multi-component system in which a maximum number $M_{bias}$ of biased measurements is selected. The objective function J(x,w) is optimised using an "Evolutionary" optimisation technique involving multiple evaluations of J(x,w). Each time the objective function J(x,w) is evaluated, a plurality of possible values for the objective function is calculated, each possible value being calculated by determining the objective function with a different $M_{bias}$ of the measurement parameters eliminated. The value of the minimum one of said plurality of calculated possible values is then assigned as the value of the objective function.

For example, if $M_{bias}$ is two, then two measurement parameters, say k and l, are eliminated at each calculation of the value of the objective function, giving us:

$$J_{k,l}(\underline{x}, \underline{w}) = \sum_{\substack{j=1 \\ j \neq k,l}}^{M} \frac{|z_j - h_j(\underline{x}, \underline{w})|}{z_{odj}(\underline{w}) \cdot \sigma_j}$$

In this way the calculations are conducted so as to systematically eliminate all possible combinations of the maximum number of biassed measurement parameter values (i.e. all possible combinations of k and l in the above example), and at least one of the calculated values, namely the lowest value can be assumed to have been arrived at without using any of the biassed measurement parameters. That is, the value assigned to the objective function in the above example would be:

$$J(\underline{x}, \underline{w}) = \min_{k,l} J_{k,l}(\underline{x}, \underline{w})$$

The Evolutionary optimisation technique disclosed in GB-A-2362481 uses an Evolution Program (EP) which is a modified form of a GA. GAs are a popular approach to solving problems involving complex, typically non-smooth, functions. In particular they lend themselves to the evaluation of multi-component systems. They can be applied to the problem of optimising, for instance minimising, the objective function J(x,w), in order to estimate values for the performance parameters x and operating parameters w based on the measured values of the measurement parameters z.

GAs are in effect search algorithms based on the mechanics of natural selection. A population of possible solutions to a problem, each represented by a string of information, is initially created. Each of these possible solutions is evaluated to determine its "fitness", in effect the likelihood that it is close to the correct solution. A second generation population of possible solutions is then created based on a combination of a principal of survival of the fittest among the strings ("selection") with a structured yet random exchange of information between the strings ("cross-over") and alteration of information within the strings ("mutation") with the aim of imitating some of the innovative flair of a human approach. This process is repeated for a number of generations until the population of solutions converges to (or hopefully at least towards) the correct solution.

To take the example of the objective function introduced above, $$J_{k,l}(\underline{x}, \underline{w}) = \sum_{\substack{j=1 \\ j \neq k,l}}^{M} \frac{|z_j - h_j(\underline{x}, \underline{w})|}{z_{odj}(\underline{w}) \cdot \sigma_j}$$

the first generation population of a GA would comprise a series of strings, each string representing one 'guess' at the values of the performance parameters $\underline{x}$ and operating parameters $\underline{w}$. The objective function would then be evaluated for each string in the population and a fitness value assigned to each string on the basis of the respective value assigned to the objective function—a low value of the objective function indicates the likelihood of a better estimate of the parameters and hence a higher fitness is assigned.

A second generation of strings is then created, the fitter strings from the first generation having the better chance of surviving to the second generation through a process of selection. The strings selected for the second generation will also be subjected to cross-over and mutation. Cross-over occurs between randomly selected pairs of strings, in which for instance a random position is selected along the length of the strings and all values of the elements (i.e. the performance and/or operating parameters) in the strings after that position are swapped with one another. In mutation single strings are randomly selected and one or more elements of the selected strings are mutated, for example by the addition of a randomly generated number.

Various forms of these three operators, selection, cross-over and mutation used in EP/GAs are well known to the skilled person.

The Evolutionary optimisation technique disclosed in GB-A-2362481 uses a uniquely constrained form of this GA based approach to optimise the objective function. Specifically, it is proposed to assume a limit to the maximum number of fault affected components in the system, which in turn defines a maximum number of fault affected performance parameters (i.e. those parameters that define the performance of the fault affected components). This assumption is then used to constrain, in a structured way, both the initial generation of the population used in the GA and the creation of subsequent generations using the selection, cross-over and mutation operators.

More specifically, the strings in the initial population are categorised to form sub-populations which will be referred to as "fault classes", each fault class representing one possible outcome in terms of faulty components. To take the very simple example of a three component system, and the assumption that a maximum of one component can be faulty, there would be three fault classes, one for a fault in each component. If it were assumed that a maximum of two components can be faulty, there would be three additional fault classes representing the possible combinations of faulty pairs of the three components.

In a more general example with X components, any 1 to S of which may be faulty, there will be X!/(X−1)!1! fault classes for the case where one component may be faulty, X!/(X−2)!2! fault classes for the case where 2 components may be faulty, and so on up to X!/(X−S)!S! fault classes for the case where S components may be faulty. The total number of fault classes is therefore the sum of:

$$X!/(X-1)!1!+X!/(X-2)!2!+ \ldots +X!/(X-S)!S!$$

In the initial creation of the strings, the values assigned to their elements representing estimated values of the performance parameters x (preferably expressed as delta values, that is to say a percentage variation from the undeteriorated base line values) are constrained in accordance with the fault class to which the string belongs. Thus, only the performance parameters associated with the fault affected component or components of the fault class are allowed to vary from the base line values (i.e. be non-zero in the preferred case of delta values).

In the creation of subsequent generations of strings during the progress of the GA optimisation, the selection operator is allowed to operate across the whole population, so that all of the fault classes compete with one another as is desired.

On the other hand, where the cross-over operator is used it is constrained to operate on pairs of strings selected from the same fault class. In this way the fault classes do not pollute one another with inappropriate fault affected parameters, as would be the case if cross-mating occurred between fault classes.

Similarly, the mutation operator is constrained to prevent pollution of the fault classes with fault affected performance parameters not associated with the fault affected components of the class. This is achieved by constraining the mutation operator so that it does not operate on string elements representing performance parameters other than those performance parameters associated with the fault affected components within a class.

After a number of iterations, due to competitive selection across the fault classes, the populations of all bar one of the fault classes should die down or become extinguished and the remaining class with the majority population should be the "correct" fault class for the fault affected performance parameters. In this way it is possible to identify the faulty components.

The constrained approach to optimising the objective function has been shown to provide satisfactory results when the multi-component system under investigation is well instrumented. That is to say, when a relatively large number of measurement parameters can be measured from the system. A typical example of a well instrumented system would be a gas turbine in its development stage.

Problems are encountered, however, when relatively few measurement parameters are available from the system under investigation, such as for example would typically be the case in pass off tests for a gas turbine. The problem is particularly acute when the number of measurements available to evaluate the objective function, taking into account any elimination of parameters through measurement biases is fewer than the number of performance parameters and operating parameters to be estimated.

It has been proposed in the past to address this lack of data by using measurements from a plurality of operating points to extract additional data from the limited set of sensors. Such a multiple operating point analysis (MOPA) is described, for instance, in Stamatis, A., Papaliou, K. D., 1988: "Discrete operating condition gas path analysis", *AGARD Conference Preprint Nr* 448, Quebec, Canada. However, the solution of a problem relying on MOPA is significantly more complex than a single operating point approach, due to the larger number of operating parameters that must be accounted for and the added level of complexity introduced to the objective function, making its optimisation difficult to achieve.

However, as described in GB-A-2362481 and Gulati A., Zedda M. and Singh R., "*Gas Turbine engine and. Sensor multiple operating point analysis using optimization techniques*", AIAA 2000-3716, AIAA/SAE/ASME/ASEE 36th Joint Propulsion Conference and Exhibit, 17-19 Jul., 2000, Huntsville, Ala., satisfactory results have been achieved by using a MOPA approach in combination with the constrained optimisation approach set forth above.

Nonetheless, the combined MOPA-constrained optimisation approach does still have some practical drawbacks. Perhaps the most significant of these are the long times, even with modern computing systems, which are generally required to converge to solutions.

SUMMARY OF THE INVENTION

Thus, in general, the present invention provides methods and systems for processing data relating to the performance of a system (e.g. a power plant) having a number of distinct components, with the aim of estimating the performance of and/or detecting "faults" in the components of the system. The present invention is particularly concerned with providing methods and systems for improving the rate at which data are processed and with improving or maintaining the accuracy of the final result.

A preferred system to which the invention may be applied is a gas turbine. However, the invention may also be applied to e.g. reciprocating engines; combined cycle engines; auxiliary machinery such as compressors, pumps, electric motors etc.; engine control systems; and chemical processes and plants.

BRIEF DESCRIPTION OF THE DRAWINGS

Aspects of the invention will be further described by way of example with reference to the accompanying drawings, in which.

DETAILED DESCRIPTION OF THE INVENTION

Adaptive Evolutionary Program

Figure 1A:
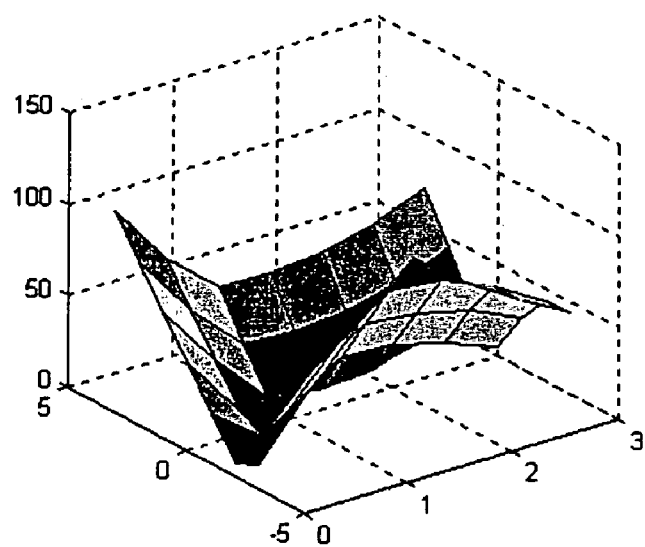
FIG. 1(a) shows the shape of a function obtained by calls to a performance simulation model.

One of the reasons for the occasional long convergence times of the constrained optimisation approach of GB-A-2362481 is that it is an iterative process. With each iteration the population of each fault class should converge towards a string representing the best estimate of actual performance and operating parameters for that class. However, convergence may occur in e.g. 2 iterations or 20 or more iterations. In certain cases convergence does not occur at all.

Thus we introduce the concept of an adaptive EP.

In a first aspect, the invention provides a method for estimating the performance of and/or detecting faults in components of a multi-component system, the performance of each component in the system being defined by one or more performance parameters x, and the performance parameters x being related to measurement parameters z which can be expressed as a function h( ) of the performance parameters x and operating parameters w defining an operating condition of the system;

the method comprising:

(a) defining a series of fault classes corresponding to possible outcomes in terms of faulty components, (b) creating an initial population of strings for each fault class, each string comprising a plurality of elements corresponding to the performance parameters x and operating parameters w, values being assigned to the string elements which represent estimated values of said parameters and which are constrained only to indicate fault affected values for performance parameters defining the performance of the fault affected component or components of the respective class, and (c) optimising an objective function J(x,w) which gives a measure of the consistency between measured values of the measurement parameters z collected from the system and calculated values of the measurement parameters;

the optimisation being an Evolutionary Program based method comprising the repetitively performed steps of:

(i) evaluating the objective function for each string and, on the basis of this evaluation, assigning a fitness value to each string, and (ii) creating a next generation population of strings using a selection operator and at least one of a cross-over operator and a mutation operator, the selection operator employing the assigned fitness values to determine the strings that survive to the next generation, the cross-over operator, if used, being constrained to operate on pairs of strings from the same fault class, and the mutation operator, if used, being constrained so that it does not operate on string elements representing performance parameters other than those performance parameters associated with the fault affected components within the respective class, the Evolutionary Program based method further comprising:

associating a set of convergence criteria with the string population, and at intervals during population evolution monitoring the population for conformity with the convergence criteria, wherein if the population does not conform with the convergence criteria the string membership of the population is altered and/or the probability of string mutation and/or cross-over in the sub-population is varied with the intention of improving the convergence of subsequent generation string populations.

Thus the set of convergence criteria provides a measure by which the convergence of the string population can be judged so that, if necessary, the EP can be adapted to achieve better convergence performance.

The convergence criteria may include global criteria such as diversity factor (e.g. population standard deviation), population size, mean fitness, increase in population fitness, etc.

Thus, for example, one strategy is to increase the string population (by creating new strings) and to increase the cross-over and mutation probabilities if comparison with the convergence criteria shows that the diversity factor is too low. In another strategy., underperforming strings can be withdrawn if the population fitness does not show a sufficient rate of improvement. Subsequent lack of increase of population fitness can then be used as an indicator that the population has converged to a solution (or that further convergence towards a solution is unlikely).

The convergence criteria may also include individual (as opposed to global) criteria such as the time taken for the objective function to be evaluated for a particular string. Using this criterion, strings can be selectively withdrawn if the objective function cannot be evaluated in a short-enough time (or even at all) for the particular performance parameters and operating parameters values of the respective string.

If the string population does conform with the convergence criteria, this can be used as a trigger to terminate the Evolutionary Program.

The adaptive EP may be implemented using a master-slave configuration, the slave performing the basic EP functions (such as string selection, mutation and cross-over) and the master performing the monitoring for conformity with the convergence criteria, adapting the slave functions and manipulating the string population.

Elitist Evolutionary Program

A further concept is the implementation of an "elitist" EP for improving or maintaining the accuracy of optimisation.

Thus in another aspect, the invention provides a method for estimating the performance of and/or detecting faults in components of a multi-component system, the performance of each component in the system being defined by one or more performance parameters x, and the performance parameters x being related to measurement parameters z which can be expressed as a function h( ) of the performance parameters x and operating parameters w defining an operating condition of the system;

the method comprising:

(a) defining a series of fault classes corresponding to possible outcomes in terms of faulty components, (b) creating an initial population of strings for each fault class, each string comprising a plurality of elements corresponding to the performance parameters x and operating parameters w, values being assigned to the string elements which represent estimated values of said parameters and which are constrained only to indicate fault affected values for performance parameters defining the performance of the fault affected component or components of the respective class, and (c) optimising an objective function J(x,w) which gives a measure of the consistency between measured values of the measurement parameters z collected from the system and calculated values of the measurement parameters;

the optimisation being an Evolutionary Program based method comprising the repetitively performed steps of:

(i) evaluating the objective function for each string and, on the basis of this evaluation, assigning a fitness value to each string, and (ii) creating a next generation population of strings using a selection operator and at least one of a cross-over operator and a mutation operator, the selection operator employing the assigned fitness values to determine the strings that survive to the next generation, the cross-over operator, if used, being constrained to operate on pairs of strings from the same fault class, and the mutation operator, if used, being constrained so that it does not operate on string elements representing performance parameters other than those performance parameters associated with the fault affected components within the respective class, the Evolutionary Program based method further comprising:

copying selected strings having relatively high fitness values from early string populations, and reinserting the copied strings into later-generated populations.

By copying the performance parameter and operating parameter values of selected high fitness strings, the elitist EP ensures that these value combinations are preserved. For example, the initially created string population may, by chance, have some high fitness individuals. If the value combinations of these individuals are not preserved from early rounds of crossover and mutation, these individuals can be lost. However, by reinserting the copied strings into later-generated populations the best solutions are preserved and more localised searching can follow, resulting in better accuracy.

The copied strings can be used to form a pool containing a predetermined number of fit strings. Then, as fitter strings are added to pool, the earlier copied lower fitness strings are returned to the main string population. Thus the pool helps to promote localised searching as well as preserving the best individuals.

Graduated Function Approach

In an embodiment of the constrained optimisation approach described in GB-A-2362481, a performance simulation model was used to evaluate the objective function. Taking the example of the objective function:

$$J(\underline{x}, \underline{w}) = \sum_{j=1}^{M} \frac{|z_j - h_j(\underline{x}, \underline{w})|}{z_{odj}(\underline{w}) \cdot \sigma_j}$$

the performance simulation model returns the values of $h_j(\underline{x},\underline{w})$ and $z_{odj}(\underline{w})$. Thus each evaluation requires two calls to the performance simulation model.

However, performance simulation models are typically slow to run and computationally burdensome. Use of such models, therefore, significantly reduces the rate of data processing.

Thus a further aspect of the invention provides a method for estimating the performance of and/or detecting faults in components of a multi-component system, the performance of each component in the system being defined by one or more performance parameters x, and the performance parameters x being related to measurement parameters z which can be expressed as a function h( ) of the performance parameters x and operating parameters w defining an operating condition of the system;

the method comprising:

(a) defining a series of fault classes corresponding to possible outcomes in terms of faulty components, (b) creating an initial population of strings for each fault class, each string comprising a plurality of elements corresponding to the performance parameters x and operating parameters w, values being assigned to the string elements which represent estimated values of said parameters and which are constrained only to indicate fault affected values for performance parameters defining the performance of the fault affected component or components of the respective class, and (c) optimising an objective function J(x,w) which gives a measure of the consistency between measured values of the measurement parameters z collected-from the system and calculated values of the measurement parameters;

the optimisation being an Evolutionary Program based method comprising the repetitively performed steps of:

(i) evaluating the objective function for each string and, on the basis of this evaluation, assigning a fitness value to each string, and (ii) creating a next generation population of strings using a selection operator and at least one of a cross-over operator and a mutation operator, the selection operator employing the assigned fitness values to determine the strings that survive to the next generation, the cross-over operator, if used, being constrained to operate on pairs of strings from the same fault class, and the mutation operator, if used, being constrained so that it does not operate on string elements representing performance parameters other than those performance parameters associated with the fault affected components within the respective class, wherein in order to evaluate the objective function for each string, said calculated values of the measurement parameters are calculated using an approximation to the function of the performance parameters and the operating parameters h(x,w) in early repetitions of step (i), and are calculated using the actual function of the performance parameters and the operating parameters h(x,w) in later repetitions of step (i).

Typically, the actual function will be embodied in a performance simulation model, in which case the approximate function can be a response surface to the model, but the method has wider applicability than this and can be used in relation to any pair of approximate and accurate functions.

Essentially, we have recognised that early stages of the optimisation (i.e. early performances of step (i) of the EP based method) do not generally require an accurate representation of the function h(x,w). Optimisation in these stages can proceed quite adequately with an approximate function, thereby reducing the computational burden and speeding up the rate of data processing.

One approach for obtaining a response surface approximation to the performance simulation model involves providing a respective objective function for each fault class.

In this approach, the response surface is calculated relative to a baseline measurement parameter vector, $\underline{z}^b$, the values of the baseline measurement parameters being obtained from a "clean" fault-free engine.

Next, for each fault class, the performance simulation model is repeatedly run, all performance parameter delta values in the vector, $\underline{x}$, being set to zero except for the delta values which characterise the respective fault class. These characterising values are varied at each repetition of the performance simulation model so as to sample "fault space" for the fault class. The result is a simulated measurement parameter vector, $\underline{z}^s$, for each combination of performance parameter delta values (i.e. for each sampled point in fault space). Thus for each fault class the value of the function:

$$J' = \sum_{j=1}^{M} \frac{|z_j^b - z_j^s|}{z_{odj}(\underline{w}) \cdot \sigma_j}$$

can be determined for each sampled point in fault space.

As an example, we consider a performance model (described in more detail in the "Detailed Example" section below) for an intercooled-recuperated engine thermodynamically similar to a Rolls-Royce/Northrop Grumman Intercooled Recuperated (ICR) WR21 gas turbine engine.

More specifically, we consider a fault class where the single faulty component is the high pressure compressor (HPC) of the engine. This class has two non-zero performance parameter delta values: flow capacity change, $\Delta\Gamma$, and efficiency reduction, $\Delta\eta$. $\Delta\Gamma$ can vary from −3% to +3%, and $\Delta\eta$ can vary from 0 to 3%. Table 1 shows selected values of $\Delta\Gamma$, $\Delta\eta$ and J', and FIG. 1(a) shows the shape, as a function of $\Delta\Gamma$ and $\Delta\eta$, of the J' response surface.

TABLE 1

|    | $\Delta\Gamma$ | $\Delta\eta$ | J' |
|----|----|----|----|
| 1, | −3.0000, | 0.0000, | 2.0427, |
| 2, | −3.0000, | 0.5000, | 3.1228, |
| 3, | −3.0000, | 1.0000, | 4.2269, |
| 4, | −3.0000, | 1.5000, | 5.3498, |
| 5, | −3.0000, | 2.0000, | 6.4931, |
| 6, | −3.0000, | 2.5000, | 7.6618, |
| 7, | −3.0000, | 3.0000, | 8.8373, |
| . | | | |
| . | | | |
| 94, | 3.0000, | 0.5000, | 4.4494, |
| 95, | 3.0000, | 1.0000, | 6.0568, |

TABLE 1-continued

|    | $\Delta\Gamma$ | $\Delta\eta$ | J' |
|----|----|----|----|
| 96, | 3.0000, | 1.5000, | 7.6868, |
| 97, | 3.0000, | 2.0000, | 9.4801, |
| 98, | 3.0000, | 2.5000, | 11.3060, |
| 99, | 3.0000, | 3.0000, | 13.1517, |

An approximation to the J' response surface of each fault class is then obtained. The approximation allows J' to be determined for any combination of performance parameter delta values without having to run the performance model. Below we discuss general regression function, generalised regression neural network, and feed forward back propagation neural network approaches to obtaining the approximate response surface.

The objective function optimised by the Evolutionary Program is given by:

$$J(\underline{x},\underline{w}) = |J'' - J'|$$

where $$J'' = \sum_{j=1}^{M} \frac{|z_j^b - z_j^r|}{z_{odj}(\underline{w}) \cdot \sigma_j},$$

and $\underline{z}^r$ the actual measurement parameter vector from a real engine which needs to be analysed for faults. This objective function differs from those given previously (which use the actual function h($\underline{x},\underline{w}$)) because the response surface is calculated relative to a baseline. Thus in the method for estimating the performance of and/or detecting faults, the objective function may change between earlier and later repetitions of step (i).

J'' is calculated using one call to the performance model. J'' is then compared by the Evolutionary Program with the J' of each fault class, each string providing a different position on the respective approximated response surface. Thus the speed of optimisation can be substantially increased because, once the response surface approximation has been set up, each use of the Evolutionary Program requires only one call to the performance model.

The string which produces the minimum value for $J(\underline{x},\underline{w})$ should be indicative of the "correct" fault class, the magnitude of the fault being inferrable from the values of the performance parameter deltas associated with that string. In practice, however, the response surface approximation is used during early repetitions of the Evolutionary Program primarily to eliminate bad or non-performing strings (e.g. strings associated with high values of $J(\underline{x},\underline{w})$) in early generations.

The response surface approach can be readily adapted to deal with measurement biases.

We have examined various techniques for forming a response surface for the performance simulation model.

General Regression Function

In this technique a general regression function is obtained from a series of Gaussian functions:

$$f(p,q) = Ae^{(-b_1 p - b_2 q)} + Be^{(-b_3 p - b_4 q)} + \ldots$$

Thus, for example, in the case of the HPC fault class discussed above, the function would be:

$$f(\Delta\eta, \Delta\Gamma) = Ae^{(-b_1 \Delta\eta - b_2 \Delta\Gamma)} + Be^{(-b_3 \Delta\eta - b_4 \Delta\Gamma)} + \ldots$$

General regression functions can be developed using e.g. the MATLAB statistical toolbox (MATLAB Ver.-6.1.0.450 Release-12.1, The Mathworks Inc.).

Figure 1B:
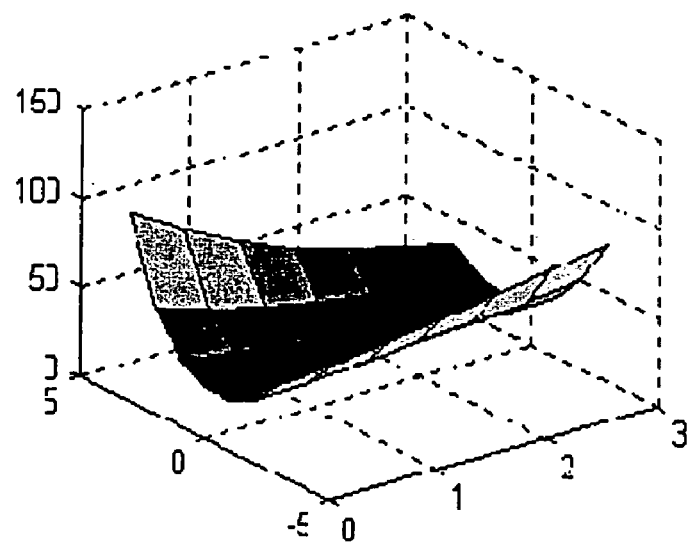
FIGS. 1(b) to (d) show the corresponding response surface approximations provided by (b) a general regression function, (c) a generalised regression neural network and (d) a feed forward back propagation neural network.

FIG. 1(b) shows the response surface approximation to the function of FIG. 1a provided by a general regression function.

The response surface is very generalised and smoothed, concealing surface details, and therefore may not be suitable for approximating highly non-linear engine performance simulation models. However, the response surface is fast and easy to compute.

Generalised Regression Neural Network

Radial basis functions (RBFs) are widely used within generalised regression neural networks (GRNNs) where they provide advantages of rapid training, generality and simplicity. Such GRNNs are several orders faster in training compared with networks based on standard back propagation, but after training are generally slower to use, requiring more computation to perform a function approximation. See for example, P. D. Wasserman, Advanced Methods in Neural Computing, New York: Van Nostrand Reinhold, 1993 on pp. 155-61; and Chen, S., C. F. N. Cowan, and P. M. Grant, "Orthogonal Least Squares Learning Algorithm for Radial Basis Function Networks", IEEE Transactions on Neural Networks, vol. 2, no. 2, March 1991, pp. 302-309.

A GRNN can approximate any arbitrary function between input and output vectors, drawing the function estimate directly from training data. Furthermore, with only mild restrictions on the function, such a GRNN is consistent, the estimation error approaching zero as the training set size become large.

GRNNs can be developed using the MATLAB neural network toolbox.

Figure 1C:
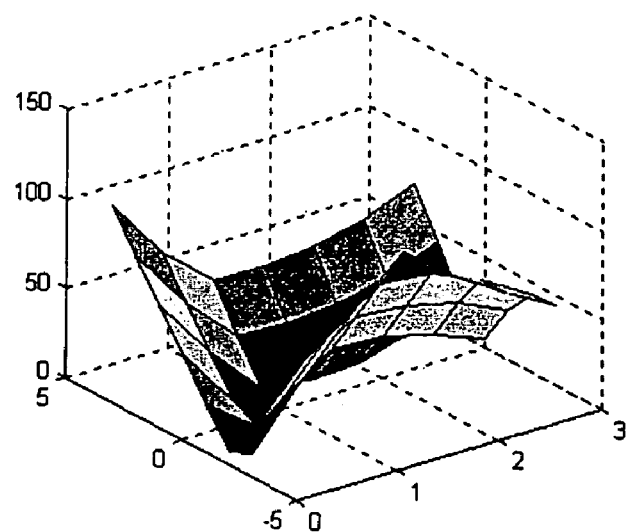

FIG. 1(c) shows the GRNN response surface function approximation of the actual surface of FIG. 1(a). The accuracy of the function approximation is very high due to the large amount of training data.

Feed Forward Back Propagation Neural Network

Feed forward back propagation neural networks (FFBPNs) are widely used for classification problems. However, they can also be used for function approximation, and for the particular purpose of forming a response surface for a performance simulation model, we have found that they represent a good compromise between speed of calculation accuracy.

Again, FFBPNs can be developed using the MATLAB neural network toolbox.

Figure 1D:
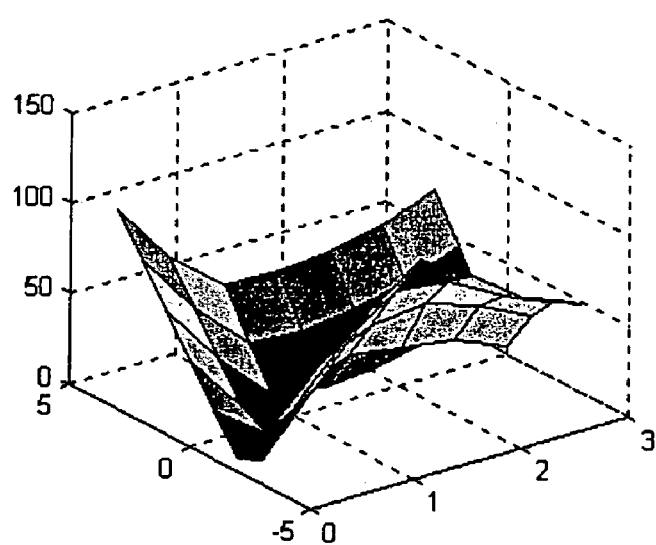

FIG. 1(d) shows the FFBPN response surface function approximation of the actual surface of FIG. 1(a). The function approximation is only slightly less accurate than that of the GRNN, but is faster to compute.

Neural Network Pre-Classification

The initial step of the constrained optimisation approach described in GB-A-2362481 is to set an assumed maximum number of fault affected components, and, based on this, to define a series of fault classes corresponding to possible outcomes in terms of faulty components. Thus, as mentioned above, the number of fault classes for which the objective function is optimised is:

$$X!/(X-1)!1!+X!/(X-2)!2!+\ldots+X!/(X-S)!S!$$

where X is the number of components and S is the maximum number of fault affected components. However, as only one of these fault classes will be the "correct" fault class, the approach involves a large amount of processing of "incorrect" fault classes.

Therefore, we introduce the concept of neural network pre-classification of the measurement parameters z collected from the system to determine the likely fault classes.

Thus a further aspect of the invention provides a method for estimating the performance of and/or detecting faults in components of a multi-component system, the performance of each component in the system being defined by one or more performance parameters x, and the performance parameters x being related to measurement parameters z which can be expressed as a function h( ) of the performance parameters x and operating parameters w defining an operating condition of the system;

the method comprising:

(a) employing a neural network to define a series of fault classes corresponding to possible outcomes in terms of faulty components, (b) creating an initial population of strings for each fault class, each string comprising a plurality of elements corresponding to the performance parameters x and operating parameters w, values being assigned to the string elements which represent estimated values of said parameters and which are constrained only to indicate fault affected values for performance parameters defining the performance of the fault affected component or components of the respective class, and (c) optimising an objective function J(x,w) which gives a measure of the consistency between measured values of the measurement parameters z collected from the system and calculated values of the measurement parameters;

the optimisation being an Evolutionary Program based method comprising the repetitively performed steps of:

(i) evaluating the objective function for each string and, on the basis of this evaluation, assigning a fitness value to each string, and (ii) creating a next generation population of strings using a selection operator and at least one of a cross-over operator and a mutation operator, the selection operator employing the assigned fitness values to determine the strings that survive to the next generation, the cross-over operator, if used, being constrained to operate on pairs of strings from the same fault class, and the mutation operator, if used, being constrained so that it does not operate on string elements representing performance parameters other than those performance parameters associated with the fault affected components within the respective class.

By using this method, the number of fault classes for which the objective function is optimised can be reduced to:

$$X!/(X-T)!T!$$

where T (which should be less than or equal to S) is the number of fault affected components determined by the neural network.

Alternatively the neural network can be trained to identify directly the most likely fault class or classes.

Preferably the neural network is a FFBPN.

The neural network pre-classification may be implemented as part of a sequentially applied series or cascade of networks, each network of the series having a separate classification task.

Figure 2:
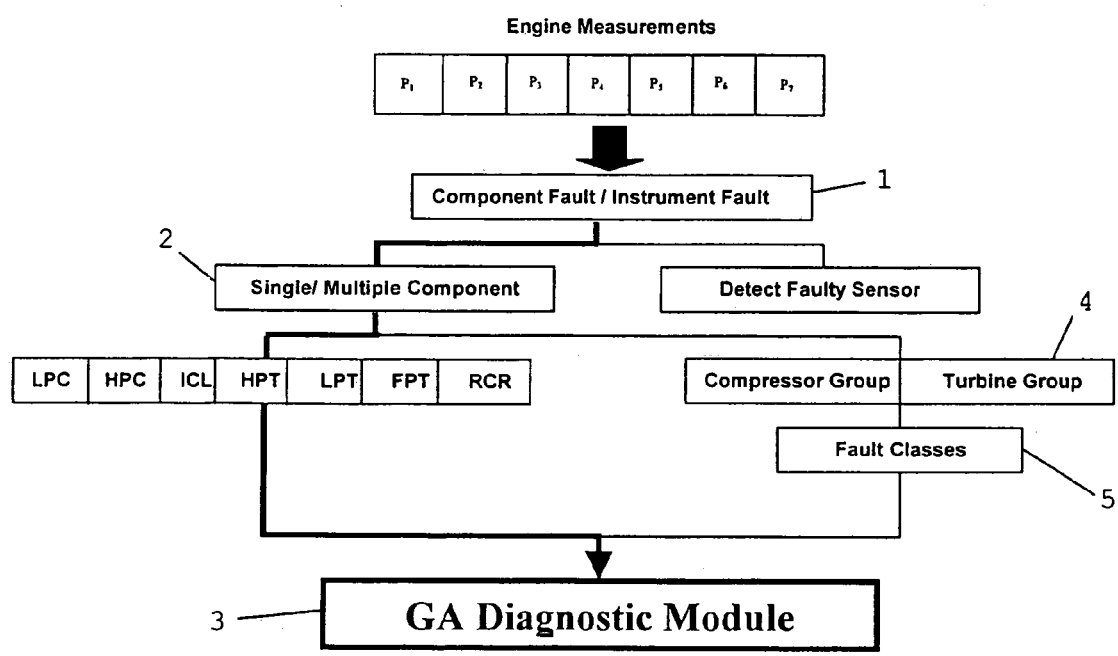
FIG. 2 shows a schematic example of a sequentially applied series of pre-classification neural networks.

FIG. 2 shows a schematic example of such a series. The first neural network 1 in the series accepts the measurement parameters (which in this example are from a gas turbine engine) and determines whether they are indicative of a component fault or instrument fault. If the former, the second neural network 2 in the series determines whether the fault is a single component fault or a multi-component fault.

If a single component fault is identified, seven fault classes (corresponding in this example to seven turbine components which are: low pressure compressor—LPC, high pressure compressor—HPC, intercooler—ICL, high pressure turbine—HPT, low pressure turbine—LPT, free power turbine—FPT, and recuperator—RCR,) are provided to a GA Diagnostic Module 3 which contains an EP optimiser.

On the other hand, if a multi-component fault is identified a next neural network 4 determines whether the faults belong to the compressor or turbine group of components. Another neural network 5 then determines the number of fault components within that group. This provides the fault classes which are then sent to the GA Diagnostic Module 3.

We have found that by limiting each network of the series to a specific task, greater accuracy is obtained compared to training a single network to immediately determine the number of faulty components.

Optional Features and Further Aspects

Each of the methods of the above aspects may be combined with any one, two or three of the methods of the other above aspects.

Furthermore, in respect of each of the above aspects, we have recognised that, when applying the constrained evolutionary optimisation approach described above, the occasional problem of the dying down or extinction of the correct fault class and convergence towards an "incorrect" fault class can be caused by a non-uniform distribution of high fitness strings among the strings in the initial population. That is, occasionally the correct fault class receives only a relatively small initial number of high fitness strings. The problem is particularly acute when the faults comprise low rates of deterioration (e.g. less than 1%) of the system's components. This leads to a reduced population for this class which can then lead to lower fitness values. In this way the population of an incorrect fault class is able to grow at the expense of the correct fault class.

Therefore, we introduce the concept of independently optimising the objective functions for the respective fault classes so that the selection of the or each best fault class can be made on the basis of completely or substantially completely optimised objective functions.

Thus in a preferred embodiment, the optimisation is performed for each class independently of the optimisations for the other classes (i.e. the Evolutionary Program based method is independently applied to each class), and the method further comprises the step (d) of selecting the class or classes having the best value or values of the objective function.

By constraining cross-over and mutation in the manner defined the integrity of each fault class is retained, and by optimising each fault class separately there is no competition between fault classes for the purpose of selection. On completion of step (c), the fault class having the best value (i.e. the least value in the case of a minimisation optimisation) of the objective function represents the faulty components. Also the values of the performance parameters x which produce the best value of the objective function quantify the loss of performance in the faulty components.

A further advantage of the preferred embodiment is that values of the objective function are available for each fault class, which allows for comparison between fault classes. In the approach of GB-A-2362481 described previously only one fault class survived so that such a comparison was not possible.

Yet another advantage of the preferred embodiment is that the optimisations of the objective functions for the fault classes may be performed in parallel (i.e. simultaneously.), e.g. on a corresponding number of processors. Thus, although the overall computational burden may be increased compared with known methods, the actual time required to arrive at a particular solution may be reduced.

More specifically, in respect of the first aspect, when implementing this preferred embodiment, a set of convergence criteria is associated with each fault class (i.e. string population).

If desired, for each of the above aspects, the power of the search carried out by the EP approach proposed above, may be improved by supplementing it with what might be termed a local search or optimisation algorithm. One suitable form of local search algorithm that can be used for this purpose are so called Evolution Strategies (ES), described for example in Michalewicz, Z., 1996: "*Genetic Algorithms+ Data Structures=evolution programs*", Springer Verlag, 3rd Edition. Other suitable forms are e.g neural networks, calculus-based techniques, and fuzzy logic techniques.

Thus the method of each aspect may comprise the further step of further optimising the objective function by performing a local search on the respective fault class. In particular, when a plurality of classes have been selected at step (d) according to the preferred embodiment described above, and the optimised objective functions of the selected fault classes have similar values (as occasionally happens), the result of this optional additional step may be used to identify the "correct" fault class. Even if it is not possible to identify the "correct" fault class in this way, it is often found that the competing selected fault classes have one or more components in common, which components are likely to be those which are faulty.

Alternatively (or additionally), the present invention may employ a local search algorithm, to periodically refine the better strings in each fault class of the series of fault classes. For example, the best m strings in each fault class might be used to initialise a series of ES (one for each fault class) every n generations of the EP. The ES are run starting from these initial values for a fixed number of iterations. If the final solutions given by the ES are better (e.g. result in lower values of the objective function) than the m strings with which the ES were initialised, the strings are substituted with the results of the ES prior to the next generation of the EP. Typically, m=5 and n=10 would be appropriate to give some enhancement of the method without increasing the computational burden too greatly.

The methods of the invention discussed above may conveniently be implemented in software, for execution on any appropriate digital computer including one or more memory devices for storing the various data and one or more processors for executing the methods.

Thus further aspects of the invention respectively provide a computer or linked computers operatively configured to implement any of the methods of the previous aspects of the invention; computer programming product or products (such as ROM, RAM, floppy discs, hard drives, optical compact discs, magnetic tapes, and other computer-readable media) carrying computer code for implementing any of the methods of the previous aspects of the invention; and a computer program per se for implementing any of the methods of the previous aspects of the invention.

DETAILED EXAMPLES

Engine Model

A performance code for an intercooled-recuperated engine, thermodynamically similar to the ICR WR21 engine has been developed using a generic engine performance code Turbomatch (developed at Cranfield University).

Figure 3:
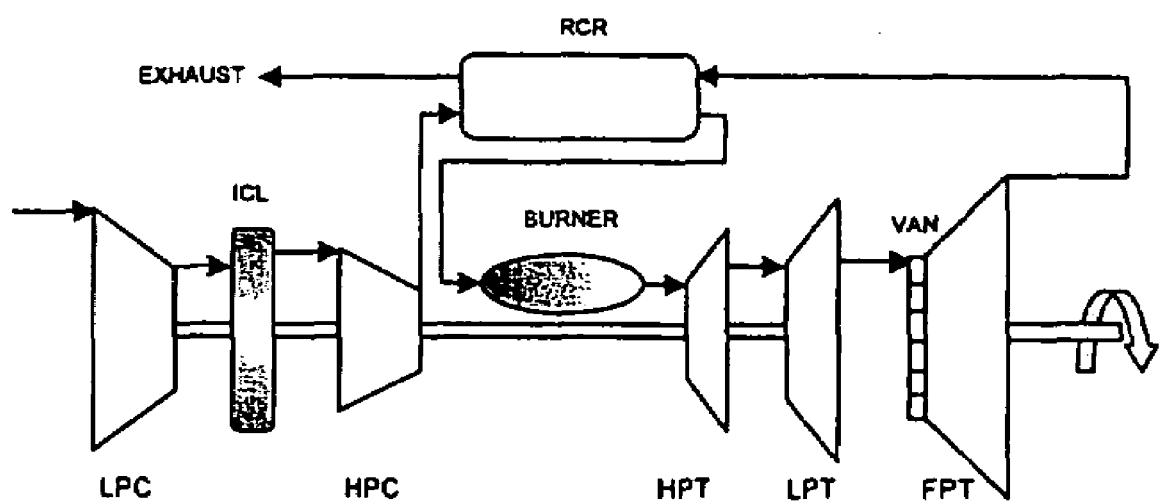
FIG. 3 shows a schematic diagram of an ICR-WR21 engine, FIGS. 4a and b show comparative example diagnosis test reports corresponding to two fault scenarios, and FIGS. 5a and b show example diagnosis test reports corresponding to the fault scenarios of FIGS. 4a and b.

A schematic diagram of the engine is shown in FIG. 3. The advanced cycle engine has an intercooler (ICL) between the low pressure compressor (LPC) and the high pressure compressor (HPC). After the burner, the hot gas pass through a high pressure turbine (HPT), a low pressure turbine (LPT) and a free power turbine (FPT). The heat from the hot gas after the FPT is recovered through a recuperator (RCR) and therefore the compressed air entering the burner is further heated, which in turn reduces the fuel input to the burner. In addition, a Variable Area Nozzle (VAN) is used before the FPT in order to maintain a constant temperature.

Fault Class Classification

Fault diagnosis was applied to seven of the turbine components: LPC, HPC, ICL, HPT, LPT, FPT, RCR. It was assumed that a maximum of two components could be faulty simultaneously. Therefore, fault searching was limited to fault classes containing either one or two components. The seven components gave rise to 28 fault classes which are shown in Table 2.

Operating Point 1 (OP-1): Power=26400 HP, Ambient Temperature=308.15K, Ambient Pressure=1 Atmosphere.

Operating Point 2 (OP-2): Power=24000 HP, Ambient Temperature=308.15K, Ambient Pressure=1 Atmosphere.

Furthermore two fault scenarios were considered. In the first of these a fault was implanted in the HPC providing a reduction in HPC efficiency ($\Delta\eta$) of 3.00% and a change in HPC flow capacity ($\Delta\Gamma$) of −4.00%. In the second, a fault was implanted in the LPC providing a reduction in LPC efficiency ($\Delta\eta$) of 1.00% and a change in LPC flow capacity ($\Delta\Gamma$) of −3.00%, and a further fault was implanted in the HPT providing a reduction in HPT efficiency ($\Delta\eta$) of 2.00%

TABLE 2

| Fault Class | Components in Fault Class | | Performance Parameters(PP) of Components | | | |
|---|---|---|---|---|---|---|
| | Component-1 | Component-2 | $PP_{Comp\text{-}1}$ | $PP_{Comp\text{-}1}$ | $PP_{Comp\text{-}2}$ | $PP_{Comp\text{-}2}$ |
| FC-1 | LPC | — | EF | FC | — | — |
| FC-2 | HPC | — | EF | FC | — | — |
| FC-3 | ICL | — | EF | FC | — | — |
| FC-4 | HPT | — | EF | FC | — | — |
| FC-5 | LPT | — | EF | FC | — | — |
| FC-6 | FPT | — | EF | FC | — | — |
| FC-7 | RCR | — | FF | LF | — | — |
| FC-8 | LPC | HPC | EF | FC | EF | FC |
| FC-9 | LPC | ICL | EF | FC | FF | LF |
| FC-10 | LPC | HPT | EF | FC | EF | FC |
| FC-11 | LPC | LPT | EF | FC | EF | FC |
| FC-12 | LPC | FPT | EF | FC | EF | FC |
| FC-13 | LPC | RCR | EF | FC | FF | LF |
| FC-14 | HPC | ICL | EF | FC | FF | LF |
| FC-15 | HPC | HPT | EF | FC | EF | FC |
| FC-16 | HPC | LPT | EF | FC | EF | FC |
| FC-17 | HPC | FPT | EF | FC | EF | FC |
| FC-18 | HPC | RCR | EF | FC | FF | LF |
| FC-19 | ICL | HPT | FF | LF | EF | FC |
| FC-20 | ICL | LPT | FF | LF | EF | FC |
| FC-21 | ICL | FPT | FF | LF | EF | FC |
| FC-22 | ICL | RCR | FF | LF | FF | LF |
| FC-23 | HPT | LPT | EF | FC | EF | FC |
| FC-24 | HPT | FPT | EF | FC | EF | FC |
| FC-25 | HPT | RCP | EF | FC | FF | LF |
| FC-26 | LPT | FPT | EF | FC | EF | FC |
| FC-27 | LPT | RCR | EF | FC | FF | LF |
| FC-28 | FPT | RCR | EF | FC | FF | LF |

EF = Efficiency,
FC = Flow Capacity,
FF = Fouling Factor,
LF—Leakage Factor

Test Cases

Two operating points were considered, consisting of the following environment and power settings:

and a change in HPT flow capacity ($\Delta\Gamma$) of 4.00%. Tables 3 and 4 respectively show simulated measurement parameters for these two scenarios at the two operating points.

TABLE 3

Case 1: HPC ($\Delta\eta$: 3.00%, $\Delta\Gamma$: −4.00%)

| SI No | Station | OP-1 | OP-2 | Sensor Type | Units |
|---|---|---|---|---|---|
| 1 | HP Compressor (In) | 2.4686 | 2.4076 | Pressure | Atmosphere |
| 2 | HP Compressor (Exit | 11.7087 | 11.1117 | Pressure | Atmosphere |
| 3 | IC Differential | 0.0504 | 0.0491 | Pressure | Atmosphere |
| 4 | HP Compressor (In) | 313.2969 | 312.1558 | Temperature | Kelvin |
| 5 | HP Compressor (Exit) | 521.5140 | 512.0514 | Temperature | Kelvin |
| 6 | Combustor Entry | 792.6706 | 769.6127 | Temperature | Kelvin |

TABLE 3-continued

Case 1: HPC (Δη: 3.00%, ΔΓ: −4.00%)

| SI No | Station | OP-1 | OP-2 | Sensor Type | Units |
|---|---|---|---|---|---|
| 7 | Power Turbine (In) | 1115.9117 | 1074.2185 | Temperature | Kelvin |
| 8 | Power Turbine (Exit) | 848.8079 | 820.7999 | Temperature | Kelvin |
| 9 | HP Shaft Speed (RPM) | 8208.4912 | 8129.8457 | Tachometer | RPM |
| 10 | LP Shaft Speed (RPM) | 6280.5479 | 6132.2026 | Tachometer | RPM |

TABLE 4

Case 2: LPC (Δη: 1.00%, ΔΓ: −3.00%), HPT (Δη: 2.00%, ΔΓ: 4.00%)

| SI No | Station | OP-1 | OP-2 | Sensor Type | Units |
|---|---|---|---|---|---|
| 1 | HP Compressor (In) | 2.5200 | 2.4570 | Pressure | Atmosphere |
| 2 | HP Compressor (Exit) | 11.4203 | 10.8221 | Pressure | Atmosphere |
| 3 | IC Differential | 0.0514 | 0.0501 | Pressure | Atmosphere |
| 4 | HP Compressor (In) | 312.8828 | 311.7689 | Temperature | Kelvin |
| 5 | HP Compressor (Exit) | 514.5628 | 506.0643 | Temperature | Kelvin |
| 6 | Combustor Entry | 799.2399 | 779.9763 | Temperature | Kelvin |
| 7 | Power Turbine (In) | 1126.1593 | 1089.1025 | Temperature | Kelvin |
| 8 | Power Turbine (Exit) | 857.7009 | 833.7476 | Temperature | Kelvin |
| 9 | HP Shaft Speed (RPM) | 8258.4756 | 8160.9365 | Tachometer | RPM |
| 10 | LP Shaft Speed (RPM) | 6254.1577 | 6093.7715 | Tachometer | RPM |

Example Fault Diagnoses

Before performing the diagnostics, maximum and minimum values for the performance parameters were set such that the search is constrained within these limits. Table 5 shows the constraints imposed on the performance parameter of the individual components.

TABLE 5

| Fault Class | Component 1 PP Limits | | | | Component 2 PP Limits | | | |
|---|---|---|---|---|---|---|---|---|
| | Efficiency | | Flow Capacity | | Efficiency | | Flow Capacity | |
| | Min | Max | Min | Max | Min | Max | Min | Max |
| FC-1 | 0.00 | 3.50 | −3.50 | 3.50 | — | — | — | — |
| FC-2 | 0.00 | 3.50 | −3.50 | 3.50 | — | — | — | — |
| FC-3 | 0.00 | 10.00 | 0.00 | 10.00 | — | — | — | — |
| FC-4 | 0.00 | 3.50 | −3.50 | 3.50 | — | — | — | — |
| FC-5 | 0.00 | 3.50 | −3.50 | 3.50 | — | — | — | — |
| FC-6 | 0.00 | 3.50 | −3.50 | 3.50 | — | — | — | — |
| FC-7 | 0.00 | 10.00 | 0.00 | 10.00 | — | — | — | — |
| FC-8 | 0.00 | 3.50 | −3.50 | 3.50 | 0.00 | 0.00 | −3.50 | 3.50 |
| FC-9 | 0.00 | 3.50 | −3.50 | 3.50 | 0.00 | 10.00 | 0.00 | 10.00 |
| FC-10 | 0.00 | 3.50 | −3.50 | 3.50 | 0.00 | 3.50 | −3.50 | 3.50 |
| FC-11 | 0.00 | 3.50 | −3.50 | 3.50 | 0.00 | 3.50 | −3.50 | 3.50 |
| FC-12 | 0.00 | 3.50 | −3.50 | 3.50 | 0.00 | 3.50 | −3.50 | 3.50 |
| FC-13 | 0.00 | 3.50 | −3.50 | 3.50 | 0.00 | 10.00 | 0.00 | 10.00 |
| FC-14 | 0.00 | 3.50 | −3.50 | 3.50 | 0.00 | 10.00 | 0.00 | 10.00 |
| FC-15 | 0.00 | 3.50 | −3.50 | 3.50 | 0.00 | 3.50 | −3.50 | 3.50 |
| FC-16 | 0.00 | 3.50 | −3.50 | 3.50 | 0.00 | 3.50 | −3.50 | 3.50 |
| FC-17 | 0.00 | 3.50 | −3.50 | 3.50 | 0.00 | 3.50 | −3.50 | 3.50 |
| FC-18 | 0.00 | 3.50 | −3.50 | 3.50 | 0.00 | 3.50 | −3.50 | 3.50 |
| FC-19 | 0.00 | 10.00 | 0.00 | 10.00 | 0.00 | 3.50 | −3.50 | 3.50 |
| FC-20 | 0.00 | 10.00 | 0.00 | 10.00 | 0.00 | 3.50 | −3.50 | 3.50 |
| FC-21 | 0.00 | 10.00 | 0.00 | 10.00 | 0.00 | 3.50 | −3.50 | 3.50 |
| FC-22 | 0.00 | 10.00 | 0.00 | 10.00 | 0.00 | 10.00 | 0.00 | 10.00 |
| FC-23 | 0.00 | 3.50 | −3.50 | 3.50 | 0.00 | 3.50 | −3.50 | 3.50 |
| FC-24 | 0.00 | 3.50 | −3.50 | 3.50 | 0.00 | 3.50 | −3.50 | 3.50 |
| FC-25 | 0.00 | 3.50 | −3.50 | 3.50 | 0.00 | 10.00 | 0.00 | 10.00 |
| FC-26 | 0.00 | 3.50 | −3.50 | 3.50 | 0.00 | 3.50 | −3.50 | 3.50 |
| FC-27 | 0.00 | 3.50 | −3.50 | 3.50 | 0.00 | 10.00 | 0.00 | 10.00 |
| FC-28 | 0.00 | 3.50 | −3.50 | 3.50 | 0.00 | 10.00 | 0.00 | 10.00 |

For the ICL and the RCR, FF and LF are implemented on a scale of 1 to 10.

Two example fault diagnoses were performed. The first was a comparative example based on the Genetic Algorithm (GA) approach described in GB-A-2362481. The second applied the approach of the present invention, which we term Integrated Fault Diagnosis.

COMPARATIVE EXAMPLE

The GA optimisation started with the random generation of a predefined number of strings. These strings were subjected to the genetic operators, namely selection, crossover and mutation, and a new set of strings or population was then produced. This process continued for a predefined number of generations and stopped. The fault class having the lowest objective function was indicative of the fault.

A problem with this method was the long convergence time. Since the population size and number of generations were fixed, the process had to evaluate all the strings, irrespective of the fitness values. Also evaluation of objective function was computationally expensive as it involved running the engine performance model twice (clean and faulty) for each string.

FIGS. 4a and b show test reports WR21/DIAG/139 and WR21/DIAG/0.144 corresponding to the two fault scenarios. The reports illustrate the performance of the diagnostic model. In each case, the model correctly identified the fault class and came up with reasonable values for the magnitudes of the implanted faults. However, the diagnostics run times-were nearly 20 hours and 24 hours respectively.

Integrated Fault Diagnosis Example

As a first step, a cascade of neural networks (arranged e.g. as shown in FIG. 2) was used to preclassify the data for each test case. The neural networks had been trained to identify, from a set of measurement parameters, the fault class or classes most likely to be responsible for those parameters. The neural networks identified fault class 2 for the first test case, and fault classes 10, 19, 23 and 26 for the second test case.

Before the measurement parameters were fed into the networks, the classification accuracy of each network was ascertained using simulated random data. This allowed a confidence rating to be associated with each prediction made by a network. For example, using the simulated data, a particular network might incorrectly classify a first fault class as another fault class a significant number of times. That information could then be used to carry forward both fault classes when the network, being fed actual data, made a prediction of the first fault class. This procedure allowed the network cascade to make a prediction of four likely fault classes for the second test case.

For each test case, integrated fault diagnosis (IFD) was then performed. The IFD approach differed from the approach of the comparative example in that: (1) it was only applied to the fault classes identified by the neural networks, (2) a response surface approximation to the performance simulation model was used for the first ten string generations (the response surface being provided by a FFBPN), (3) an elitist string preservation strategy was implemented, and (4) the GA was adaptive in that the number of strings and the probabilities of string cross-over and mutation could be varied, and in that string generation could be terminated if convergence was achieved early (this adaptive system was implemented via a master-slave relationship as described previously)

FIGS. 5a and b show test reports WR21/DIAG/159 and WR21/DIAG/163 corresponding to the two fault scenarios.

In case 2 the model correctly identified the fault class, and in both cases 1 and 2 came up with reasonable values for the magnitudes of the implanted faults. However, the diagnostics run times were only about ½ hour and 3 hours respectively, which is a significant improvement over the run times of the comparative example.

The reduced run time allows each diagnosis to be re-performed more times over a given period, whereby a statistical set of results can be built up. The more times the same fault is detected in a particular set, the greater the confidence a user can have that the fault has been identified correctly.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A method for estimating the performance of and/or detecting faults in components of a multi-component system,
   the performance of each component in the system being defined by one or more performance parameters x, and
   the performance parameters x being related to measurement parameters z which can be expressed as a function h( ) of the performance parameters x and operating parameters w defining an operating condition of the system;
   the method comprising:
   (a) defining a series of fault classes corresponding to possible outcomes in terms of faulty components,
   (b) creating an initial population of strings for each fault class, each string comprising a plurality of elements corresponding to the performance parameters x and operating parameters w, values being assigned to the string elements which represent estimated values of said parameters and which are constrained only to indicate fault affected values for performance parameters defining the performance of the fault affected component or components of the respective class,
   (c) optimising an objective function $J(x,w)$ which gives a measure of the consistency between measured values of the measurement parameters z collected from the system and calculated values of the measurement parameters, and
   (d) using the fault class associated with the optimised objective function to estimate the performance of components of the system and detect faults in components of the system;
   the optimisation being an Evolutionary Program based method comprising the repetitively performed steps of:
   (i) evaluating the objective function for each string and, on the basis of this evaluation, assigning a fitness value to each string, and
   (ii) creating a next generation population of strings using a selection operator and at least one of a cross-over operator and a mutation operator, the selection operator employing the assigned fitness values to determine the strings that survive to the next generation, the cross-over operator, if used, being constrained to operate on pairs of strings from the same fault class, and the mutation operator, if used, being constrained so that it does not operate on string elements representing performance parameters other than those performance parameters associated with the fault affected components within the respective class,
   the Evolutionary Program based method further comprising:
   associating a set of convergence criteria with the string population, and at intervals during population evolution monitoring the population for conformity with the convergence criteria, wherein if the population does not conform with the convergence criteria the string membership of the population is altered and/or the probability of string mutation and/or cross-over in the sub-population is varied with the intention of improving the convergence of subsequent generation string populations.

2. A method according to claim 1, wherein the Evolutionary Program based method further comprises:
   copying selected strings having relatively high fitness values from early string populations, and reinserting the copied strings into later-generated populations.

3. A method according to claim 1, wherein in order to evaluate the objective function for each string, said calculated values of the measurement parameters are calculated using an approximation to the function of the performance parameters and the operating parameters $h(x,w)$ in early repetitions of step (i), and are calculated using the actual function of the performance parameters and the operating parameters $h(x,w)$ in later repetitions of step (i).

4. A method according to claim 1, wherein in step (a) a neural network is employed to define the series of fault classes.

5. A method according to claim 1, wherein in step (c) the objective function $J(x,w)$ is optimised for each fault class independently of the optimisations for the other fault classes, and the method further comprises the step of:
   (d) selecting the class or classes having the best value or values of the objective function.

6. A computer or linked computers operatively configured to implement any one of the methods of claim 1.

7. A computer readable storage medium on which is recorded data for causing a computer to execute the method of claim 1.

8. A method for estimating the performance of and/or detecting faults in components of a multi-component system, the performance of each component in the system being defined by one or more performance parameters x, and the performance parameters x being related to measurement parameters z which can be expressed as a function h( ) of the performance parameters x and operating parameters w defining an operating condition of the system;

the method comprising:
- (a) defining a series of fault classes corresponding to possible outcomes in terms of faulty components,
- (b) creating an initial population of strings for each fault class, each string comprising a plurality of elements corresponding to the performance parameters x and operating parameters w, values being assigned to the string elements which represent estimated values of said parameters and which are constrained only to indicate fault affected values for performance parameters defining the performance of the fault affected component or components of the respective class,
- (c) optimising an objective function J(x,w) which gives a measure of the consistency between measured values of the measurement parameters z collected from the system and calculated values of the measurement parameters, and
- (d) using the fault class associated with the optimised objective function to estimate the performance of components of the system and detect faults in components of the system;

the optimisation being an Evolutionary Program based method comprising the repetitively performed steps of:
- (i) evaluating the objective function for each string and, on the basis of this evaluation, assigning a fitness value to each string, and
- (ii) creating a next generation population of strings using a selection operator and at least one of a cross-over operator and a mutation operator, the selection operator employing the assigned fitness values to determine the strings that survive to the next generation, the cross-over operator, if used, being constrained to operate on pairs of strings from the same fault class, and the mutation operator, if used, being constrained so that it does not operate on string elements representing performance parameters other than those performance parameters associated with the fault affected components within the respective class, the Evolutionary Program based method further comprising:
copying selected strings having relatively high fitness values from early string populations, and reinserting the copied strings into later-generated populations.

9. A method for estimating the performance of and/or detecting faults in components of a multi-component system, the performance of each component in the system being defined by one or more performance parameters x, and the performance parameters x being related to measurement parameters z which can be expressed as a function h( ) of the performance parameters x and operating parameters w defining an operating condition of the system;

the method comprising:
- (a) defining a series of fault classes corresponding to possible outcomes in terms of faulty components,
- (b) creating an initial population of strings for each fault class, each string comprising a plurality of elements corresponding to the performance parameters x and operating parameters w, values being assigned to the string elements which represent estimated values of said parameters and which are constrained only to indicate fault affected values for performance parameters defining the performance of the fault affected component or components of the respective class,
- (c) optimising an objective function J(x,w) which gives a measure of the consistency between measured values of the measurement parameters z collected from the system and calculated values of the measurement parameters, and
- (d) using the fault class associated with the optimised objective function to estimate the performance of components of the system and detect faults in components of the system;

the optimisation being an Evolutionary Program based method comprising the repetitively performed steps of:
- (i) evaluating the objective function for each string and, on the basis of this evaluation, assigning a fitness value to each string, and
- (ii) creating a next generation population of strings using a selection operator and at least one of a cross-over operator and a mutation operator, the selection operator employing the assigned fitness values to determine the strings that survive to the next generation, the cross-over operator, if used, being constrained to operate on pairs of strings from the same fault class, and the mutation operator, if used, being constrained so that it does not operate on string elements representing performance parameters other than those performance parameters associated with the fault affected components within the respective class, wherein in order to evaluate the objective function for each string, said calculated values of the measurement parameters are calculated using an approximation to the function of the performance parameters and the operating parameters h(x,w) in early repetitions of step (i), and are calculated using the actual function of the performance parameters and the operating parameters h(x,w) in later repetitions of step (i).

10. A method for estimating the performance of and/or detecting faults in components of a multi-component system, the performance of each component in the system being defined by one or more performance parameters x, and the performance parameters x being related to measurement parameters z which can be expressed as a function h( ) of the performance parameters x and operating parameters w defining an operating condition of the system;

the method comprising:
- (a) employing a neural network to define a series of fault classes corresponding to possible outcomes in terms of faulty components,
- (b) creating an initial population of strings for each fault class, each string comprising a plurality of elements corresponding to the performance parameters x and operating parameters w, values being assigned to the string elements which represent estimated values of said parameters and which are constrained only to indicate fault affected values for performance parameters defining the performance of the fault affected component or components of the respective class, (c) optimising an objective function J(x,w) which gives a measure of the consistency between measured values of the measurement parameters z collected from the system and calculated values of the measurement parameters, and (d) using the fault class associated with the optimised objective function to estimate the performance of components of the system and detect faults in components of the system;

the optimisation being an Evolutionary Program based method comprising the repetitively performed steps of:

(i) evaluating the objective function for each string and, on the basis of this evaluation, assigning a fitness value to each string, and (ii) creating a next generation population of strings using a selection operator and at least one of a cross-over operator and a mutation operator, the selection operator employing the assigned fitness values to determine the strings that survive to the next generation, the cross-over operator, if used, being constrained to operate on pairs of strings from the same fault class, and the mutation operator, if used, being constrained so that it does not operate on string elements representing performance parameters other than those performance parameters associated with the fault affected components within the respective class.

11. A device for estimating the performance of and/or detecting faults in components of a multi-component system, the performance of each component in the system being defined by one or more performance parameters x, and the performance parameters x being related to measurement parameters z which can be expressed as a function h( ) of the performance parameters x and operating parameters w defining an operating condition of the system; the device comprising:

a processor configured to define a series of fault classes corresponding to possible outcomes in terms of faulty components, create an initial population of strings for each fault class, each string comprising a plurality of elements corresponding to the performance parameters x and operating parameters w, values being assigned to the string elements which represent estimated values of said parameters and which are constrained only to indicate fault affected values for performance parameters defining the performance of the fault affected component or components of the respective class, optimise an objective function J(x,w) which gives a measure of the consistency between measured values of the measurement parameters z collected from the system and calculated values of the measurement parameters, and use the fault class associated with the optimised objective function to estimate the performance of components of the system and detect faults in components of the system; and at least one of a display for displaying at least one of the optimised objective function, the estimate of the performance of components of the system, or a detected fault in a component of the system, or a memory, for storing at least one of the optimised objective function, the estimate of the performance of components of the system, or a detected fault in a component of the system, the optimisation being an Evolutionary Program based method comprising the repetitively performed steps of:

(i) evaluating the objective function for each string and, on the basis of this evaluation, assigning a fitness value to each string, and (ii) creating a next generation population of strings using a selection operator and at least one of a cross-over operator and a mutation operator, the selection operator employing the assigned fitness values to determine the strings that survive to the next generation, the cross-over operator, if used, being constrained to operate on pairs of strings from the same fault class, and the mutation operator, if used, being constrained so that it does not operate on string elements representing performance parameters other than those performance parameters associated with the fault affected components within the respective class, the Evolutionary Program based method further comprising:

associating a set of convergence criteria with the string population, and at intervals during population evolution monitoring the population for conformity with the convergence criteria, wherein if the population does not conform with the convergence criteria the string membership of the population is altered and/or the probability of string mutation and/or cross-over in the sub-population is varied with the intention of improving the convergence of subsequent generation string populations.

12. A device for estimating the performance of and/or detecting faults in components of a multi-component system, the performance of each component in the system being defined by one or more performance parameters x, and the performance parameters x being related to measurement parameters z which can be expressed as a function h( ) of the performance parameters x and operating parameters w defining an operating condition of the system; the device comprising:

a processor configured to define a series of fault classes corresponding to possible outcomes in terms of faulty components, create an initial population of strings for each fault class, each string comprising a plurality of elements corresponding to the performance parameters x and operating parameters w, values being assigned to the string elements which represent estimated values of said parameters and which are constrained only to indicate fault affected values for performance parameters defining the performance of the fault affected component or components of the respective class, optimise an objective function J(x,w) which gives a measure of the consistency between measured values of the measurement parameters z collected from the system and calculated values of the measurement parameters, and use the fault class associated with the optimised objective function to estimate the performance of components of the system and detect faults in components of the system; and at least one of a display for displaying at least one of the optimised objective function, the estimate of the performance of components of the system, or a detected fault in a component of the system, or a memory, for storing at least one of the optimised objective function, the estimate of the performance of components of the system, or a detected fault in a component of the system, the optimisation being an Evolutionary Program based method comprising the repetitively performed steps of:
(i) evaluating the objective function for each string and, on the basis of this evaluation, assigning a fitness value to each string, and
(ii) creating a next generation population of strings using a selection operator and at least one of a cross-over operator and a mutation operator, the selection operator employing the assigned fitness values to determine the strings that survive to the next generation, the cross-over operator, if used, being constrained to operate on pairs of strings from the same fault class, and the mutation operator, if used, being constrained so that it does not operate on string elements representing performance parameters other than those performance parameters associated with the fault affected components within the respective class, the Evolutionary Program based method further comprising:
copying selected strings having relatively high fitness values from early string populations, and reinserting the copied strings into later-generated populations.

13. A device for estimating the performance of and/or detecting faults in components of a multi-component system, the performance of each component in the system being defined by one or more performance parameters x, and the performance parameters x being related to measurement parameters z which can be expressed as a function h( ) of the performance parameters x and operating parameters w defining an operating condition of the system; the device comprising:

a processor configured to define a series of fault classes corresponding to possible outcomes in terms of faulty components, create an initial population of strings for each fault class, each string comprising a plurality of elements corresponding to the performance parameters x and operating parameters w, values being assigned to the string elements which represent estimated values of said parameters and which are constrained only to indicate fault affected values for performance parameters defining the performance of the fault affected component or components of the respective class, optimise an objective function J(x,w) which gives a measure of the consistency between measured values of the measurement parameters z collected from the system and calculated values of the measurement parameters, and use the fault class associated with the optimised objective function to estimate the performance of components of the system and detect faults in components of the system; and at least one of a display for displaying at least one of the optimised objective function, the estimate of the performance of components of the system, or a detected fault in a component of the system, or a memory, for storing at least one of the optimised objective function, the estimate of the performance of components of the system, or a detected fault in a component of the system, the optimisation being an Evolutionary Program based method comprising the repetitively performed steps of:
(i) evaluating the objective function for each string and, on the basis of this evaluation, assigning a fitness value to each string, and
(ii) creating a next generation population of strings using a selection operator and at least one of a cross-over operator and a mutation operator, the selection operator employing the assigned fitness values to determine the strings that survive to the next generation, the cross-over operator, if used, being constrained to operate on pairs of strings from the same fault class, and the mutation operator, if used, being constrained so that it does not operate on string elements representing performance parameters other than those performance parameters associated with the fault affected components within the respective class, wherein in order to evaluate the objective function for each string, said calculated values of the measurement parameters are calculated using an approximation to the function of the performance parameters and the operating parameters h(x,w) in early repetitions of step (i), and are calculated using the actual function of the performance parameters and the operating parameters h(x,w) in later repetitions of step (i).

14. A device for estimating the performance of and/or detecting faults in components of a multi-component system, the performance of each component in the system being defined by one or more performance parameters x, and the performance parameters x being related to measurement parameters z which can be expressed as a function h( ) of the performance parameters x and operating parameters w defining an operating condition of the system; the device comprising:

a processor configured to employ a neural network to define a series of fault classes corresponding to possible outcomes in terms of faulty components, create an initial population of strings for each fault class, each string comprising a plurality of elements corresponding to the performance parameters x and operating parameters w, values being assigned to the string elements which represent estimated values of said parameters and which are constrained only to indicate fault affected values for performance parameters defining the performance of the fault affected component or components of the respective class, optimise an objective function J(x,w) which gives a measure of the consistency between measured values of the measurement parameters z collected from the system and calculated values of the measurement parameters, and use the fault class associated with the optimised objective function to estimate the performance of components of the system and detect faults in components of the system; and at least one of a display for displaying at least one of the optimised objective function, the estimate of the performance of components of the system, or a detected fault in a component of the system, or a memory, for storing at least one of the optimised objective function, the estimate of the performance of components of the system, or a detected fault in a component of the system, the optimisation being an Evolutionary Program based method comprising the repetitively performed steps of:
(i) evaluating the objective function for each string and, on the basis of this evaluation, assigning a fitness value to each string, and
(ii) creating a next generation population of strings using a selection operator and at least one of a cross-over operator and a mutation operator, the selection operator employing the assigned fitness values to determine the strings that survive to the next generation, the cross-over operator, if used, being constrained to operate on pairs of strings from the same fault class, and the mutation operator, if used, being constrained so that it does not operate on string elements representing performance parameters other than those performance parameters associated with the fault affected components within the respective class.

* * * * *